(12) United States Patent
Reynolds et al.

(10) Patent No.: US 11,392,373 B1
(45) Date of Patent: Jul. 19, 2022

(54) SYSTEM AND METHODS FOR CODE BASE TRANSFORMATIONS

(71) Applicant: CERNER INNOVATION, INC., Kansas City, KS (US)

(72) Inventors: William Arthur Reynolds, Lee's Summit, MO (US); Joshua David Cox, Kansas City, MO (US); Jonathan Richard Gold, Kansas City, MO (US); Gyandeep Singh, Olathe, KS (US)

(73) Assignee: CERNER INNOVATION, INC., North Kansas City, MO (US)

( * ) Notice: Subject to any disclaimer, the term of this patent is extended or adjusted under 35 U.S.C. 154(b) by 0 days.

(21) Appl. No.: 16/708,772

(22) Filed: Dec. 10, 2019

(51) Int. Cl.
*G06F 8/75* (2018.01)
*G06F 8/71* (2018.01)
*G06F 8/76* (2018.01)

(52) U.S. Cl.
CPC .............. *G06F 8/75* (2013.01); *G06F 8/71* (2013.01); *G06F 8/76* (2013.01)

(58) Field of Classification Search
CPC ...... G06F 8/427; G06F 8/433; G06F 8/70–75; G06F 16/9027; G06F 8/40; G06F 8/51; G06F 8/52; G06F 8/76
See application file for complete search history.

(56) References Cited

U.S. PATENT DOCUMENTS

| | | | | |
|---|---|---|---|---|
| 6,279,151 B1 * | 8/2001 | Breslau | ................... | G06F 8/423 717/140 |
| 8,694,971 B2 | 4/2014 | Chandra et al. | | |
| 9,026,903 B1 * | 5/2015 | Michael | ................... | G06F 40/14 715/235 |
| 9,823,909 B1 * | 11/2017 | Kuo | .......................... | G06F 8/52 |
| 2002/0083211 A1 * | 6/2002 | Driesner | ................... | G06F 9/52 719/311 |
| 2007/0102764 A1 * | 5/2007 | Ando | ................... | G11B 27/329 257/355 |
| 2007/0180441 A1 * | 8/2007 | Ding | ................... | G06F 9/44552 717/163 |
| 2010/0128866 A1 * | 5/2010 | Irun-Briz | .............. | G06F 9/4484 379/265.02 |

(Continued)

OTHER PUBLICATIONS

Vo, K.P., et al., "Incl: A Tool to Analyze Include Files", Usenix Summer 1992 Technical Conference [online], 1992 [retrieved Feb. 18, 2021], Retrieved from Internet: <URL:https://www.usenix.org/legacy/publications/library/proceedings/sa92/vo.pdf>, pp. 199-208.*

(Continued)

*Primary Examiner* — Todd Aguilera
(74) *Attorney, Agent, or Firm* — Shook, Hardy & Bacon L.L.P.

(57) ABSTRACT

Embodiments herein disclose systems, methods, and computer-readable media for automatically transforming a code base. Using the code base as input, the code base is parsed, analyzed, and a modified code base is automatically generated. The code base may be modified by changing one or more assets in the code base based on the identification of path-to-path dependencies and/or interactions, in various embodiments. In some embodiments, the identifiers for globally exposed assets in the code base are modified to add imports or exports.

17 Claims, 6 Drawing Sheets

(56) References Cited

U.S. PATENT DOCUMENTS

2017/0116109 A1* 4/2017 Perez Acosta ...... G06F 11/3664

OTHER PUBLICATIONS

Anonymous, "WebStorm 2017.2—what's new in support for JavaScript, Typescript, Angular and Sass and working with ESLint, Karma and Mocha", Sudo Null [online], 2017 [retrieved Feb. 18, 2021].*
[Item V continued] Retrieved from Internet: <URL: https://sudonull.com/post/68718-WebStorm-20172-whats-new-in-supporting-JavaScript-TypeScript-Angular-and-Sass-and-working-with-ESLin>, pp. 1-6.*
Paltoglou, A., et al., "Automatic Refactoring of Client-Side Javascript Code to ES6 Modules", IEEE 25th Int'l Conf. on Software Analysis, Evolution and Reengineering [online], 2018 [retrieved Jul. 29, 2021], Retrieved from Internet: <URL: https://ieeexplore.ieee.org/abstract/document/8330227>, pp. 402-412.*

* cited by examiner

SYSTEM AND METHODS FOR CODE BASE TRANSFORMATIONS

SUMMARY

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter. The present invention is defined by the claims as supported by the Specification, including the Detailed Description and Drawings.

In one embodiment, one or more computer-readable storage media having computer-readable instructions embodied therein for execution by one or more processors are provided. The computer-readable instructions comprise parsing each of a plurality of paths in a code base, wherein the code base stores a plurality of assets, in embodiments. The embodiment further comprises extracting a plurality of identifiers that correspond to the plurality of assets, and generating a first data object that comprises an aggregation of the plurality of identifiers extracted. In some embodiments, inter-path correlations are identified from the first data object, and a second data object that comprises the inter-path correlations is generated. Then, in some embodiments, based on the first data object and the second data object, at least one of the plurality of assets in the code base is modified. Generally, modifying the at least one of the plurality of assets comprises transforming the at least one of the plurality of assets to add an import or an export.

In another embodiment, one more computer-readable storage media having computer-readable instructions embodied therein for execution by one or more processors are provided. The computer-readable instructions comprise receipt of a code base that comprises a plurality of artifacts and a plurality of paths corresponding to the plurality of artifacts. The computer-readable instructions include asynchronously parsing each of the plurality of paths, in embodiments. Further, a plurality of identifiers are extracted from the plurality of paths that correspond to the plurality of artifacts, and the plurality of identifiers extracted are aggregated, in an embodiment. A first data object is generated using the plurality of identifiers that have been aggregated, in some embodiments. In embodiments, the computer-readable instructions asynchronously identify inter-path correlations from the first data object, and further, generate a second data object comprising the inter-path correlations. Based on the first data object and the second data object, at least one of the plurality of artifacts in the code base that is globally exposed is asynchronously modifying, in various embodiments.

In an embodiment, one or more computer-readable storage media having computer-readable instructions embodied therein for execution by one or more processors are provided. The computer-readable instructions comprise receiving a content directory that comprises a plurality of assets and a plurality of paths corresponding to locations of the plurality of assets. Each of the plurality of paths correspond to the locations of the plurality of assets in the content directory are asynchronously parsed, in embodiments. In embodiments, a plurality of identifiers that correspond to the plurality of assets are extracted, from the plurality of paths, wherein the plurality of assets are globally exposed. The plurality of identifiers extracted for the plurality of assets that are globally exposed are aggregated, in some embodiments, and a first data object comprising the aggregated identifiers for the plurality of assets that are globally exposed is generated. Then, in some embodiments, the first data object is asynchronously analyzed by identifying inter-path correlations. A second data object is generated that comprises the inter-path correlations, in an embodiment. In various embodiments, based on the first data object and the second data object, at least one of the plurality of assets in the content directory is asynchronously modified, wherein asynchronously modifying the at least one of the plurality of assets comprises transforming the at least one asset of the plurality of assets that is globally exposed by adding an import or an export.

BRIEF DESCRIPTION OF THE DRAWINGS

Embodiments are described in detail below with reference to the attached drawings figures, wherein.

DETAILED DESCRIPTION

Figure 1:
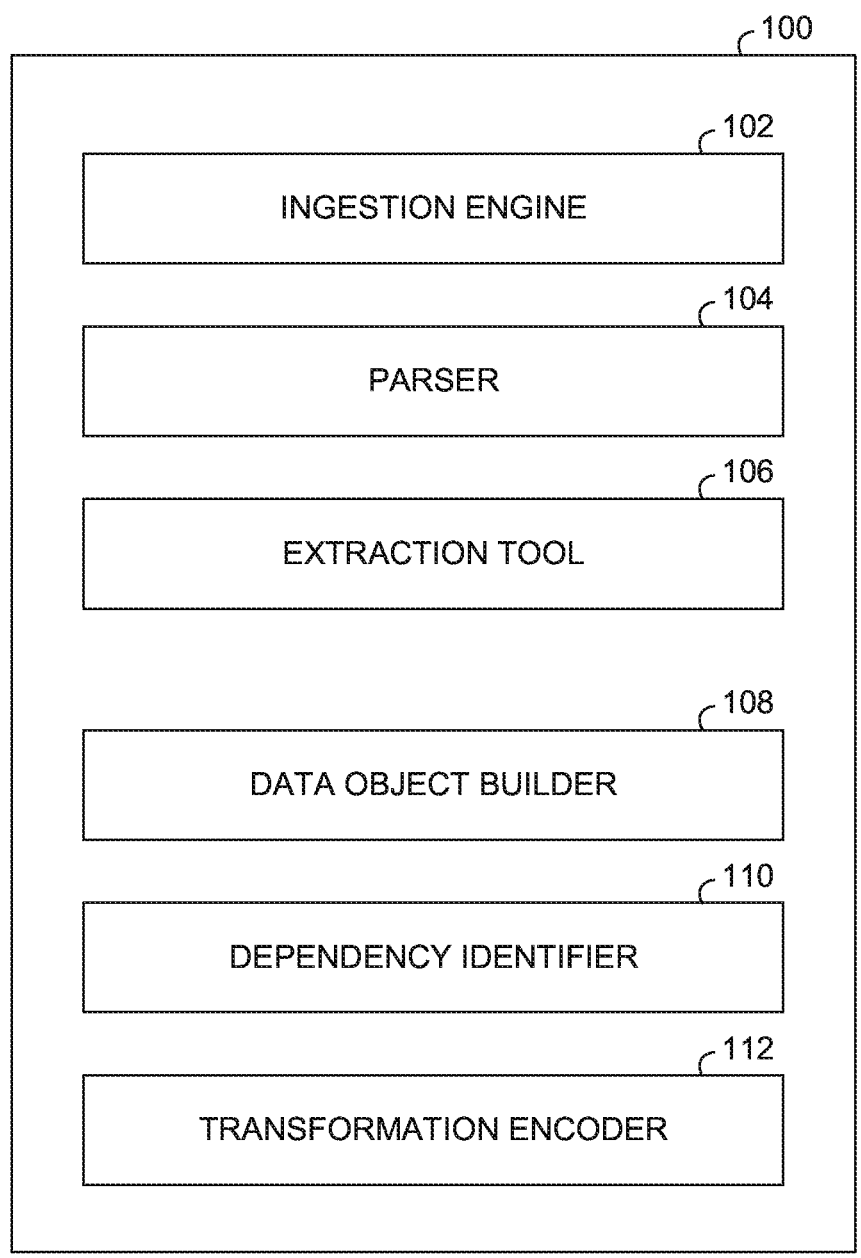
FIG. 1 is a block diagram of an example computing environment suitable to implement embodiments of the present invention.

Embodiments herein include computer-readable storage media having computer-readable instructions embodied therein for execution by one or more processors, for example, wherein the execution of the instructions results in the performance of a method for automatic, machine-facilitated transformation of code bases. Embodiments herein further include methods for automatic, machine-facilitated transformation of code bases.

Embodiments herein provide for automatic, machine-facilitated, entire code base transformations that are performed using three phases discussed herein, wherein each phase may be optionally combined with one another. In one embodiment, a parsing phase, an analysis phase, and a generation phase are used. Other embodiments may consist of a parsing phase and a generation phase. In yet another embodiment, only a parsing phase and an analysis phase are implemented. And, in one embodiment, an analysis phase and a generation phase are leveraged.

In embodiments, each phase is executed synchronously relative to another phase, e.g., the parsing phase is executed and completes prior to the analysis phase being initiated, and the analysis phase is executed and completes prior to the generation phase being initiated. However, the one or more functions performed within each individual phase are performed asynchronously, e.g., a plurality of paths are parsed in an asynchronous manner in the parsing phase, updates to various paths and/or assets in the code base are performed asynchronously in the generation phase).

Using the phases discussed herein, structured data is output, for example, as a transformed code base. As such, the embodiments here ingest a code base and update the entirety of the code base, automatically and without further user input. In one embodiment, using a parsing phase, an analysis phase, and a generation phase, as described in detail hereinafter, code changes may be implemented and automatically performed on a massive scale (i.e., entire code bases, multiple content directories) without user input beyond an indication to begin the first parsing phase, for example. In another embodiment, using a parsing phase and a generation phase, 1:1 code changes may be implemented and automatically performed on a massive scale (i.e., entire code bases, multiple content directories) without user input beyond an indication to load the code base and/or begin the parsing phase. For example, non-interrelated artifacts may be changed by replacing an existing code pattern (or a new identifier) with a new code pattern (or new identifier), thereby changing hundreds or thousands of artifacts at one time. In yet another embodiment, using a parsing phase and an analysis phase, information about the artifacts in a content directory may be harvested and aggregated, such that a mapping of the artifacts in the content directly may be generated, without user input beyond an indication to load the code base and/or begin the parsing phase, for example. In another embodiment, only a parsing phase, only an analysis, or only a generation phase is performed. For example, the generation phase may be used alone to add a file to an artifact. Current technologies do not support the parsing, analysis, and generation phases discussed herein without significant user input and direction.

DEFINITIONS

The term "asset" refers to a file. An example of an asset is a JavaScript file, an image file, or a CSS file. The term "artifact" refers to a plurality or 'collection' of assets. An example of an artifact is a Maven™ artifact, a plurality of image files, a plurality of CSS files, a binary distribution, a source distribution, a plurality of JavaScript files, a Java ARchive (JAR) file, a Web Application Resource file or Web application ARchive (WAR) file, or a combination thereof. In some embodiments, an artifact is identifiable using a group identifier (e.g., reversed domain name such as "com.example.name"), an artifact-specific identifier (e.g., "name"), a version string, an extension, and/or a classifier.

The term "content directory" refers to a directory that contains a module or a package. The content directory may be a representation of a code repository, in some embodiments. Thus, the terms "content directory" and "code repository" are used interchangeably herein.

The term "path" refers to a string representation of an asset location or an artifact location. For example, the path may represent or describe a file location, such as a directory path or a root path within a content directory.

The term "identifier" refers to a token or variable name that is defined in an asset, or which is referenced in an asset. In embodiments, an identifier is a token or a variable name that is extractable from within a file or asset located at a path.

The term "program" refers to a specially-programmed computer module or computer tool that is purposefully configured to perform specific computing functions, for example, by executing one or more computer-readable instructions that are stored in memory using one or more processors.

An "inter-path correlation" refers to paths for assets or artifacts that have dependencies within the code base, and/or paths for assets or artifacts that interact with one another.
Example Systems FIG. 1 depicts an example of a computing device 100 that may be used to implement embodiments discussed herein. In some embodiments, the computing device 100 comprises a server, such as a physical server or a virtual server. The computing device 100 may be a plurality of devices, such as a set or a collection of physical servers and/or virtual servers, in some embodiments. In such embodiments, the computing devices may communicate with one another over a network, and the computing devices may operate in a distributed networking environment. The computing devices may communicate locally with one another, in one embodiment, such that the computing devices may operate within a localized networking environment.

Regarding FIG. 1, it will be understood by those of ordinary skill in the art that the computing device 100 depicted is not intended to limit the scope of use or functionality of the present embodiments. Similarly, the computing device 100 should not be interpreted as imputing any dependency and/or any requirements with regard to each component illustrated therein. It will be appreciated by those having ordinary skill in the art that the components illustrated are contemplated to potentially include hardware, software, and/or other devices for establishing a communications link between the components, devices, systems, and/or entities, as may be utilized in implementation of the present embodiments. As such, the absence of component(s) should not be interpreted as limiting the present embodiments to exclude additional component(s) and/or combination(s) of components. Moreover, though devices and components in the figures may be represented as singular devices and/or components, it will be appreciated that some embodiments can include a plurality of devices and/or components such that the figures should not be considered as limiting the number of devices and/or components.

In embodiments, the computing devices comprises one or more of an ingestion engine 102, a parser 104, an extraction tool 106, a data object builder 108, a dependency identifier 110, and/or transformation encoder 112. Each of these components may comprise, individually or together, a specially-programmed computer module or computer tool that is purposefully configured to perform specific computing functions, for example, by executing one or more computer-readable instructions that are stored in memory using one or more processors. The computing device 100 comprises an ingestion engine 102, in some embodiments. In some embodiments, the ingestion engine 102 obtains, receives, accesses, or references a code base. The ingestion engine 102 may, in an embodiment, load a code base into an environment for performing an automatic, machine-facilitated transformation of the code base. In some embodiments, the code base comprises a content directory. The code base may comprise, in various embodiments, one or more assets and/or artifacts that have been generated during a computer software build. In some embodiments, the ingestion engine 102 receives a code base that comprises a plurality of assets and/or artifacts. One example of an artifact is a Maven™ artifact. In an embodiment, the code base comprises a plurality of paths corresponding to locations of the plurality of assets and/or artifacts. In some embodiments, one or more assets and/or artifacts may be globally exposed, while one or more other assets and/or artifacts may not be globally exposed. As discussed herein, it will be understood that an identifier of an assert or artifacts can be globally exposed, such that for simplicity herein, an asset or artifact can be referred to as being globally exposed based on the identifier being globally exposed. In a similar vein, it will be understood that modifying an asset and/or artifact, as discussed herein, can refer to modifying the identifier that corresponds to the asset and/or artifact. For simplicity, modifications to assets are discussed hereinafter, but it should be understood that the identifier is modified in embodiments.

The computing device 100 comprises a parser 104, in embodiments. For example, the parser 104 may be computer performed task(s) that reads and returns at least a portion of data from one or more paths in a content directory. In some embodiments, the parser 104 parses one or more paths in the code base. In an embodiment, the parser 104 may parse a plurality of paths in the code base. The parser 104, in some embodiments, may parse all of the plurality of paths in the code base. In one embodiment, the parser 104 may asynchronously parse one or more of a plurality of paths in the code base. Accordingly, the parser 104 may parse a plurality of the paths in the code base concurrently, in various embodiments. In this manner, the parser 104 may be used to process all paths in the code base quickly and at one time. For example, the parser 104 may asynchronously parse each of the plurality of paths in the code base, wherein the plurality of paths correspond to or specify the locations of a plurality of assets in the code base. In one embodiment, the parser 104 is an AST parser.

The computing device 100 further comprises an extraction tool 106, in some embodiments. In an embodiment, the extraction tool 106 extracts one or more identifiers from one or more path in the code base. In some embodiments, the extraction tool 106 may extract, from the plurality of paths, a plurality of identifiers that correspond to the plurality of assets. The extraction tool 106, in some embodiments, may extract an identifier from each of the paths parsed by the parser 104. Accordingly, a unique identifier may be extracted by the extraction tool 106 from each path in the code base, as parsed by the parser 104, in various embodiments. In embodiments, identifiers may be extracted at the time of parsing, concurrently with parsing, as parsing is performed, or immediately subsequent to parsing. In an embodiment, one identifier may be extracted from one path in the code base, wherein that one identifier may correspond to both the path, and an identifier of an asset or artifact to which the path 'points.' In some embodiments, the extraction tool 106 may extract an identifier from a path that correspond to a globally-exposed asset or artifact in the code base. In further embodiments, the extraction tool 106 may specifically extract identifiers for each of the plurality of paths in the code base that corresponds to a globally-exposed asset or artifacts. In one embodiment, one or more identifiers are only extracted for those one or more paths that point to a globally exposed asset or artifact.

Continuing, the computing device 100 comprises a data object builder 108, in embodiments. In embodiments, the data object builder 108 may receive the one or more identifiers extracted, for example, by the extraction tool 106. The data object builder 108 may, in some embodiments, aggregate one or more of the identifiers extracted. For example, in some embodiments, only a portion of a plurality of extracted identifiers are aggregated. In another example, only those identifiers extracted from paths that corresponds to the location of globally-exposed assets or artifacts are aggregated. Alternatively, all of the identifiers extracted may be aggregated, in some embodiments. In one embodiment, the data object builder 108 may aggregate the plurality of identifiers extracted from a plurality of paths for the plurality of assets in the code base. In various embodiments, identifiers extracted for paths that correspond to globally exposed assets are aggregated by the data object builder 108.

The data object builder 108 may generate a first data object, in embodiments. In some embodiments, the first data object comprises one or more of the identifiers extracted from the parsed paths, as aggregated together. In one embodiment, the first data object comprises a plurality of identifiers extracted from the parsed paths, as aggregated together. In further embodiments, the first data object comprises all of the extracted and aggregated identifiers. In another embodiment, the first data object comprises only a portion of the extracted and aggregated identifiers, for example, those identifiers that correspond to a path or paths for globally exposed assets or artifacts. Generally, the first data object may be a structured data instance that stores or contains the information output from the parser 104 and/or extraction tool 106. Once the first data object is generated by the data object builder 108, the parsing phase is completed and the analysis phase may be initiated, in various embodiments. In embodiments, the first data object is a utility object that serves as the input for the analysis phase.

The first data object may be provided to a dependency identifier 110 of the computing device 100, in some embodiments. For example, the dependency identifier 110 may be computer performed task(s) that analyzes the first data object.

In some embodiments, the dependency identifier 110 may identify inter-path correlations based on the data contained by the first data object. In one embodiment, the dependency identifier 110 processes the first data object, such that one or more inter-path correlations are identified concurrently, in various embodiments. In this manner, the dependency identifier 110 may be used to process all data in the first data object quickly and at one time. Additionally, the dependency identifier 110 may identity, using the first data object, each path in the plurality of paths that includes one or more of a global reference and/or a global exposure. The dependency identifier 110 may generate a dependency graph that represents the identified inter-path correlations for those paths that include one or more of the global reference and/or global exposure.

Based on the inter-path correlations identified and/or determined using the first data object, the data object builder 108 may generate a second data object. Generally, the second data object may be a structured data instance that stores or contains the information output from the dependency identifier 110, in embodiments. As such, the second data object may store data representing or encoding information of the inter-path correlations that have been identified. Once the second data object is generated by the data object builder 108, the analysis phase is completed and the generation phase may be initiated, in various embodiments. In one particular example, EcmaScript 5 JavaScript files may be converted into EcmaScript 6 JavaScript modules.

Example Methods

Continuing to FIGS. 2-5, methods are provided. The methods may be computer-implemented methods. In one embodiment, one or more non-transitory computer-readable storage media having computer-readable instructions or computer-readable program code portions embodied thereon, for execution via one or more processors, can be used to implement and/or perform the methods. For example, computer-readable instructions or computer-readable program code portions can specify the performance of the methods, can specify a sequence of steps of the methods, and/or can identify particular component(s) of a software and/or hardware for performing one or more of the steps of the methods, in embodiments. The computer-readable instructions or computer-readable program code portions can correspond to an application plugin or an application programming interface (API), in some embodiments. In one embodiment, the plugin or API can implement and/or perform the methods. As discussed below, the methods can be performed using software, hardware, component(s), and/or device(s), for example, as shown in FIGS. 1, 6 and 7.

As discussed below, the methods discussed herein may perform three phases, in various combinations, to return structured data and/or pseudo-structured data as a data instance, where that data instance comprises a transformed code base, for example. At a high level, the structure of the three phases may be represented with the following type definition indicating the structure of the three phases, in computer programming instructions, as follows:

```
interface IProteus<P, A, G>{
    paths: string[ ];
    parsed: {[path: string]: P};
    analysis: A;
    generated: {[path: string]: G};
}
```

Figure 2:
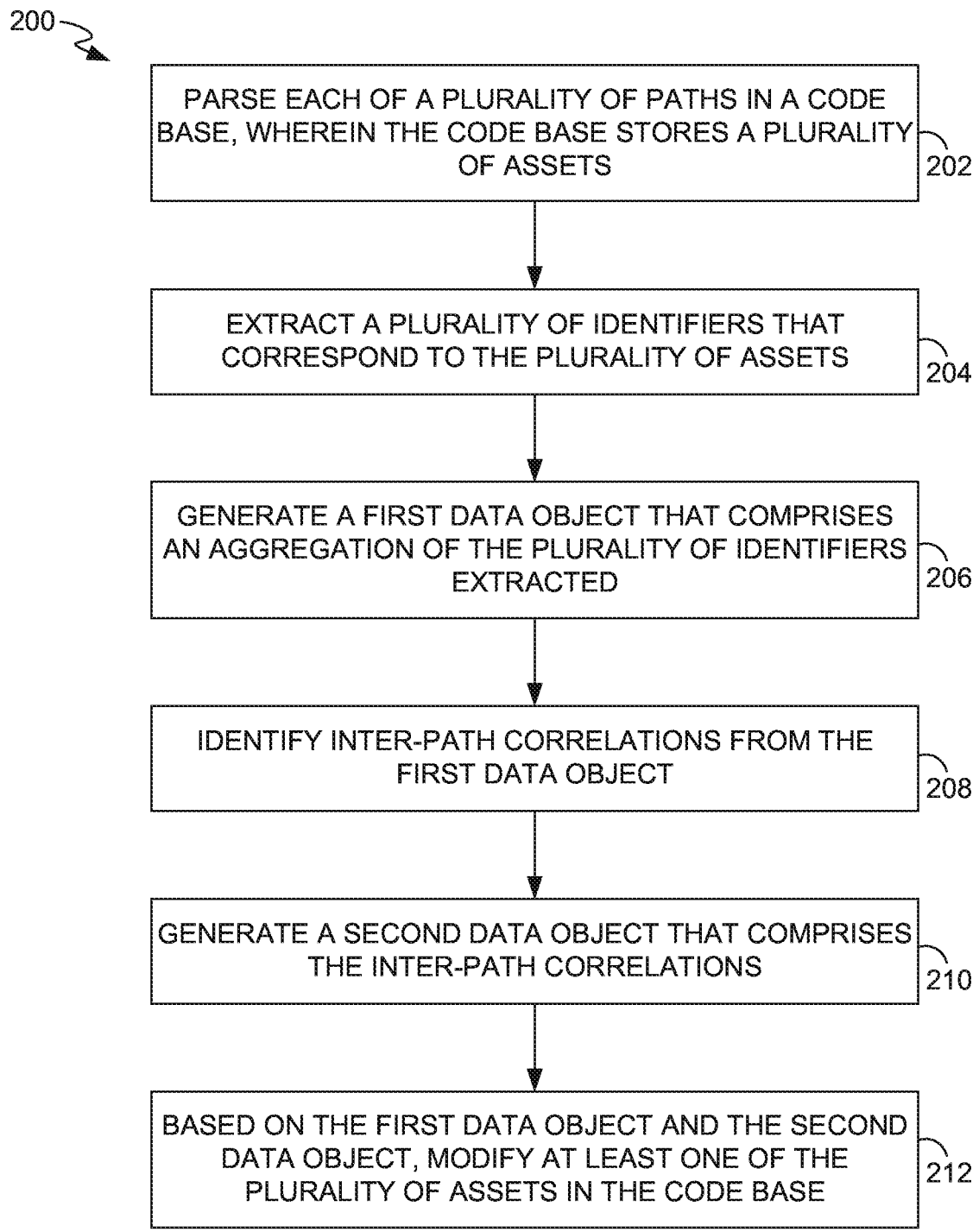
FIG. 2 is a flow diagram showing an example method in accordance with an embodiment of the present invention.

At FIG. 2, a method 200 is provided for transforming a code base. In accordance with the method 200, a code base may be accessed, obtained, or received. The code base may comprise a content directory, in an embodiment. In further embodiments, the code base may comprise a plurality of content directories. The code base, or the one or more content directories of a code base, in embodiments, may comprise a plurality of paths corresponding to locations of a plurality of assets. In some embodiments, the code base is a content directory and the plurality of paths are directory paths that point to one or more assets or artifacts.

In embodiments, the method 200 comprises parsing a plurality of paths in the code base, wherein the code base stores a plurality of assets, as shown in block 202. In some embodiments, each of the plurality of paths are parsed. Additionally, in some embodiments, the method 200 identifies the plurality of the paths in the code base as one aspect of parsing the paths.

Generally, parsing of the code base corresponds to the parsing phase. As such, in some embodiments, a parser, such as the parser 104 of FIG. 1, parses each of a plurality of paths in a code base, wherein the code base stores a plurality of assets. In one embodiment, an AST parse function is used to parse each of the plurality of paths in the code base. The parser may comprise a computer function that uses a utility object as input and returns a "promise" with requested data.

An example of a parser is as follows:
```
interface IParseUtilityBelt {
    useCache: (key: symbol)=>ProteusCache;
    path: string;
}
interface IProteusPlan<P, A, G, hasParse=true, hasAnalyze=true>{
    parse: (util: IParseUtilityBelt)=>P|Promise<P>;
}
```

In embodiments, the utility object (i.e., "util") that acts as input to the parsing phase may comprise one or more paths (e.g., the path is a content directory, repository, or a file) in the code base, in some embodiments. The utility object may further comprise a tool for caching parsed data (e.g., caching the parsed paths in the content directory), in an embodiment. In one embodiment, the utility object comprises at least one path and a tool for caching data as the data is parsed by the parser 104 of FIG. 1, for example.

An example of a parser that is configured to retrieve a "package.json" from "contentDirectory" is as follows:
```
/**
*Read/Parse the 'package.json' file within a content directory
*@function parse
*@param {string} contentDirectory
*@returns {*} the hydrated 'package.json' object
*/
const parse=({path: contentDirectory}: IParserUtility): boolean=>
    require(path.join(contentDirectory, "package.json"))
```

In the method 200, shown at block 204, a plurality of identifiers are extracted that correspond to the plurality of paths. The plurality of identifiers may correspond to the plurality of paths and/or corresponding assets in the code base, in embodiments. In some embodiments, an extraction tool, such as the extraction tool 106 of FIG. 1, extracts the plurality of identifiers that correspond to the plurality of assets.

At block 206, a first data object is generated. The first data object comprises an aggregation of the plurality of identifiers extracted, in embodiments. The first data object, in one embodiment, comprises information collected from the plurality of paths, for example, in addition to one or more identifiers. In one embodiment, a data object builder, such as the data object builder 108 of FIG. 1, may aggregate the extracted identifiers and/or additional information obtained by parsing the code base to generate the first data object. Once the first data object is generated, the parsing phase is completed and the analysis phase may be initiated, in various embodiments. In embodiments, the first data object is a utility object that serves as the input for the analysis phase.

At block 208, inter-path correlations are identified from the first data object. In some embodiments, data within the first data object may be organized, sorted, correlated, compared, and/or differentiated in accordance with the method 200. One or more inter-path correlations may be identified, in an embodiment. In another embodiment, a plurality of inter-path correlations are identified. In some embodiments, at least one dependency is determined between two or more of the plurality of paths, based on the first data object. In such an embodiment, the dependency may be used as the basis for identifying there is an inter-path correlation between the two or more paths. Generally, inter-path correlation identification corresponds to the analysis phase. As such, in some embodiments, a dependency identifier, such as the dependency identifier 110 of FIG. 1, uses the first data object as input and identifies one or more inter-path correlations. In some embodiments, a dependency identifier, as previously described, may comprise a computer function that uses a utility object as input and returns a promise with requested data, for example, by organizing, sorting, correlating, comparing, and/or differentiating the parsed data.

An example of a dependency identifier for performing inter-path correlations is as follows, represented as a type declaration:
```
interface IAnalyzeUtilityBelt<P, A, G, hasParsed>{
    parsed: hasParsed extends true ? {[path: string]: P}: undefined;
    paths: string[ ];
}
export interface IProteusPlan<P, A, G, hasParse=true, hasAnalyze=true>{
    analyze: (util: IAnalyzeUtilityBelt<P, A, G, hasParse>)=>A|
```

Promise<A>;
}

The type declaration shown above indicates a type of data which the specified function should utilize as inputs and the type of data which the specified function should return. In some embodiments, the utility object (e.g., "util") that acts as input for the analysis phase may comprise one or more parsed code bases and paths, in one embodiment. In an embodiment, the utility object input to the extraction tool 106 may comprise an array of one or more paths (e.g., an array of strings for the plurality of paths). The utility object input to the extraction tool 106 may comprise the parsed data obtained, for example, from a parser, such as parser 104 of FIG. 1, in some embodiments. In an embodiment, the utility object input to the for the analysis phase may comprise all of the content directories, an array of paths, and the parsed data obtained from one or more code bases.

Another example of a dependency identifier for performing inter-path correlations in the analysis phase is as follows:
/*Assume named parsers are defined above*/
const MPageNamespaceAnalyzer=({paths: contentDirectories, parsed}:
IAnalyzerUtility contentDirectories
.map((contentDirectory)=>({contentDirectory,
//Use the 'parsed' utility to grab the MPageNamespaceParser's data for this
//content directory
isInMPagesNamespace: parsed[contentDirectory]
}))
//Filter out 'contentDirectories' that aren't in the MPages Namespace
.filter(({isInMPagesNamespace: boolean}): boolean=>isInMPagesNamespace)
//Map the final array back to the 'contentDirectories' only
.map((({contentDirectory})=>contentDirectory);

Continuing, at block 210, a second data object is generated that comprises the inter-path correlations. The second data object may comprise the dependency graph. The second data object comprises the information output from the analysis phase, such as inter-path correlations, and may further include information on data organization, data sorting, data/path correlations, data/path comparisons, and/or data differentiations performed in the analysis phase by the dependency identifier, for example, in various embodiments. In one embodiment, a data object builder, such as the data object builder 108 of FIG. 1, may aggregate of the output of the analysis phase to generate the second data object. For example, one or more parsed identifiers, or all of the parsed identifiers, that are assigned to a global environment are located and the asset(s) to which each identifier corresponds may be marked. Further, one or more parsed identifiers, or all of the parsed identifiers, that are referenced in the global environment may be located and the asset(s) to which each identifier corresponds may be marked. Then, in the example, correlations or dependencies between one or more, or all of, the marked asserts are determined. Once the second data object is generated, the analysis phase is complete and the generation phase may be initiated, in various embodiments. In embodiments, the second data object is a utility object that serves as the input for the generation phase.

At block 212, based on the first data object and the second data object, at least one of the assets is modified in the code base. Alternatively, in some embodiments, no identifiers and/or no assets may be modified, for example, when changes are not necessary in the code base. In other embodiments, one or more assets are asynchronously modified, such that multiple assets are modified concurrently (e.g., as opposed to processing and modifying one path at a time). For example, the modifications may comprise changing or transforming the one or more assets to add an import or an export. In some embodiments, a transformation encoder, such as the transformation encoder 112 of FIG. 1, modifies one or more assets in the code base based on the first and second data object. The transformation encoder may comprise a computer function that uses a "utility object" as input and resolves with a Boolean to indicate which assets are modified and which assets are not modified.

An example of a transformation encoder function for modifying a code base is shown as a type definition, as follows:
interface IGenerateUtilityBelt<P, A, G, hasParsed, hasAnalysis>{
parsed: hasParsed extends true ? {[path: string]: P}: undefined;
analysis: hasAnalysis extends true ? A: undefined;
path: string;
useCache: (key: symbol)=>ProteusCache;
useHash: (opts: HashOptions)=>Promise<( )=>Promise<boolean>>;
}
export interface IProteusPlan<P, A, G, hasParse=true, hasAnalyze=true>{
generate: (util: IGenerateUtilityBelt<P, A, G, hasParse, hasAnalyze>)=>G|
Promise<G>
}

In some embodiments, the utility object input to the transformation encoder may comprise a content directory path, wherein the content directory path is a string. The utility object input to the transformation encoder may comprise the first data object that was generated, in an embodiment. In some embodiments, the utility object input to the transformation encoder comprises the second data object that was generated. In one embodiment, the utility object input to the transformation encoder comprises a content directory path (i.e., a string), the first data object (i.e., parsed data including aggregation of extracted identifiers), and the second data object (i.e., parsed data including inter-path correlations identified). Based on the utility object, an asset can thus be modified.

By modifying at least one of the plurality of assets in the code base, the code base is updated or modified. In some embodiments, the method 200 writes the updated code base to a disc. The updated code base may be stored as a new version of the code base in a new disc location, or alternatively, may be stored by overwriting the existing code base that was ingested. For example, the updated code base may be written to storage in a database or a server. In various embodiments, the updated code base may be run (i.e., executed) on a local server, a remote server, a virtual server, and/or via a pipeline (e.g., Jenkins pipeline). In one embodiment, the updated code base may be used as input to a script. In various embodiments, the method 200 may generate an updated code base that comprises at least one asset that is transformed to add an import or an export.

Figure 3:
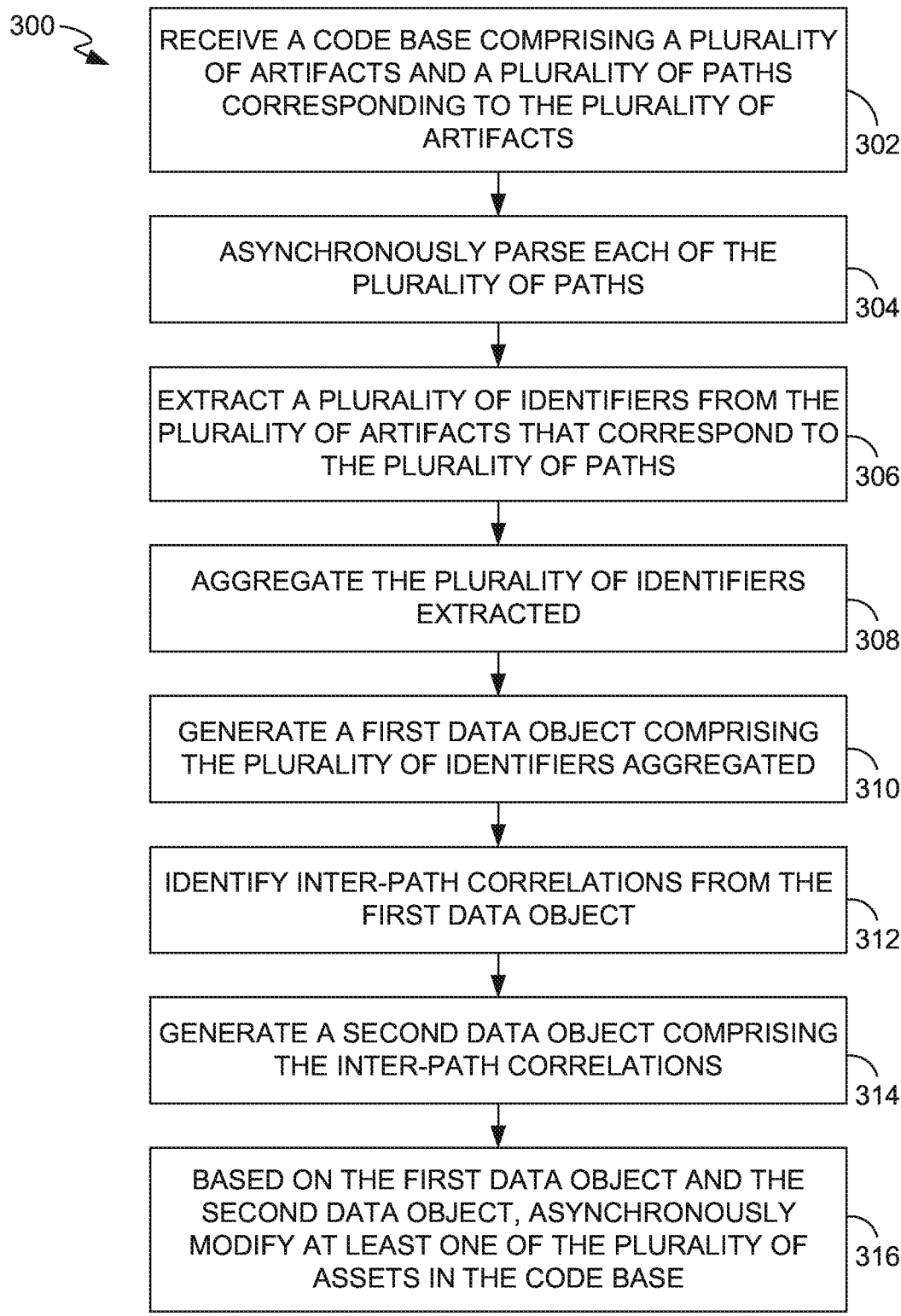
FIG. 3 is a flow diagram showing an example method in accordance with an embodiment of the present invention.

FIG. 3 provides another method 300 for transformation of code bases. At block 302, a code base is received, wherein the code base comprises a plurality of artifacts and a plurality of paths corresponding to the plurality of artifacts, in embodiments. In one embodiment, the code base comprises a plurality of content directories (e.g., a set of content directories) for a plurality of artifacts. In another embodiment, the code base comprises one content directory for a plurality of artifacts. Each of the plurality of paths is asynchronously parsed, as shown at block 304. In an embodiment, each path within the content directory is parsed, such that the path for each of a plurality of artifacts is parsed, concurrently. In some embodiments, each directory path within a plurality of content directories for a plurality of artifacts is parsed, concurrently.

At block 306, a plurality of identifiers are extracted from the plurality of artifacts that correspond to the plurality of paths. At block 308, the plurality of identifiers extracted are aggregated together. In some embodiments, additional information for the plurality of paths may be collected, and/or cached concurrently with or subsequent to parsing of the plurality of paths and/or aggregating the plurality of identifier. The additional information may be aggregated alone, separately, or together with the extracted identifiers, in various embodiments. At block 310, a first data object is generated that comprises the plurality of identifiers aggregated. For example, the first data object may comprise a first path identifier that corresponds to and points to one artifact and a second path identifier for a path that corresponds to and points to another artifact. In one embodiment, the first data object may comprise the aggregated identifiers and additional information collected for the paths.

At block 312, inter-path correlations are identified based on the first data object. For example, the method 300 may determine that two or more of the plurality of artifacts interact, based on the corresponding paths. Accordingly, the method 300 may determine that a first path and a second path interact, and/or that a third path, fourth path, and fifth path all interact. As such, any number of paths and/or assets may be determined to interact and/or share a dependency with any number of other paths and/or assets. Based on determining that two or more of the plurality of artifacts interact, for example, the method 300 may determine that there is a dependency between the two or more of the plurality of paths that correspond to the two or more artifacts, in some embodiments. The dependency of two or more paths may be used to identify that an inter-path correlation exists for the two or more paths, in an embodiment. In one embodiment, a dependency tree may be generated, wherein the dependency tree may represent each of the inter-path correlations identified. At block 314, a second data object is generated that comprises the inter-path correlations. In some embodiments, the second data object may further comprise a dependency tree that represents each of the inter-path correlations identified.

At block 316, based on the first data object and the second data object, the method 300 performs asynchronous modification of at least one of the plurality of artifacts within a code base. In one embodiment, the at least one artifact is a globally exposed artifact, for example, that is visible to an application user, wherein the application corresponds to the code base. In some embodiments, asynchronously modifying the at least one of the plurality of assets in the code base is based on the inter-path correlations identified in the second data object. Additionally or alternatively, asynchronously modifying the at least one of the plurality of assets in the code base is based on the plurality of identifiers that are aggregated in the first data object, in an embodiment.

In some embodiments, modifying at least one of the artifacts in the code base comprises transforming the artifact. For example, the artifact may be transformed by automatically (i.e., by a processor and without user input as an initiating trigger) changing source code in the code base that corresponds to the at least one artifact. Transforming the artifact may comprise automatically (i.e., by a processor and without user input as an initiating trigger) changing source code in the code base that corresponds to the artifact to indicate that the at least one artifact is an export (i.e., add a line of computer code to the end of the asset, wherein the computer code corresponds to an export). In another example, the artifact may be transformed by automatically (i.e., by a processor and without user input as an initiating trigger) changing source code in the code base that corresponds to the at least one artifact to indicate that the at least one artifact is an import (i.e., add a line of computer code to the beginning of the asset, wherein the computer code corresponds to an import). In embodiments, the source code for an artifact is changed or transformed by removing a portion of the source code and replacing the removed portion with new source code. In some embodiments, source code for an artifact is changed or transformed by removing a portion of the source code, without insertion of new source code. In another embodiment, source code for an artifact is changed or transformed by adding or inserting new source code. In some examples, an entire code base of artifacts that use the Jasmine testing framework may be changed to conform with a Jest testing framework by modifying source code base for each of a plurality of assets or artifacts.

Figure 4:
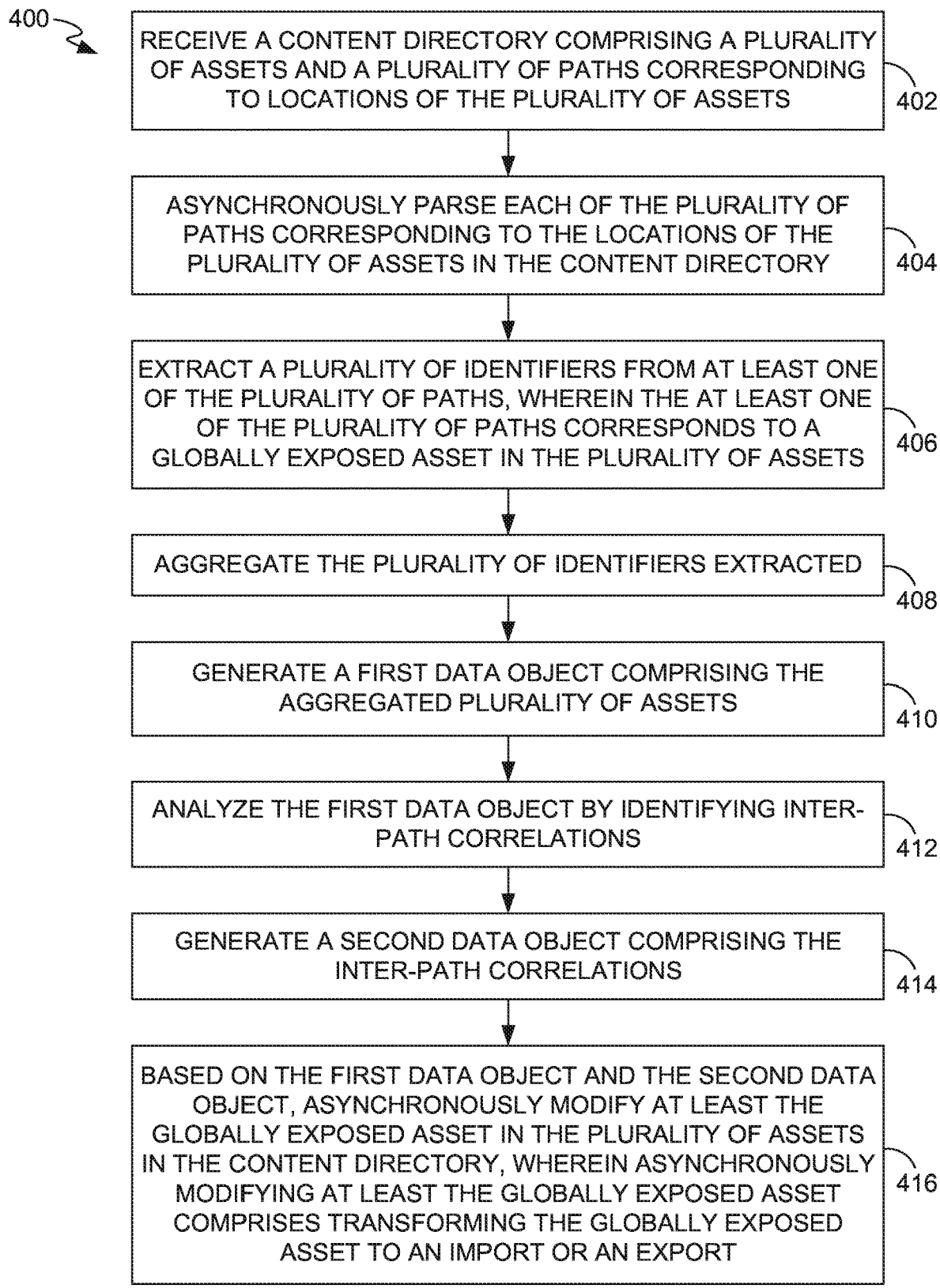
FIG. 4 is a flow diagram showing an example method in accordance with an embodiment of the present invention.

FIG. 4 provides another method 400 for transformation of a content directory. In an embodiment, a content directory is received, wherein the content directory comprises a plurality of assets and a plurality of paths corresponding to locations of the plurality of assets, as shown at block 402. Then, at block 404, each of the plurality of paths that corresponds to the locations of the plurality of assets in the content directory is asynchronously parsed. The method 400 continued, at block 406, by extracting, from the plurality of paths, a plurality of identifiers that correspond to the plurality of assets, wherein at least one of the plurality of assets are globally exposed. At block 408, the plurality of identifiers are aggregated together. In some embodiments, identifiers are extracted from a portion of the plurality paths that correspond to globally exposed assets, and those identifiers for globally exposed assets are aggregated together.

A first data object is generated that comprises the aggregated identifiers for the plurality of assets, as illustrated at block 410. In one embodiment, the first object generated comprises the aggregated identifiers for globally exposed assets. The first data object, at block 412, is asynchronously analyzed by identifying inter-path correlations using the first data object. A second data object comprising the inter-path correlations is generated at block 414. In an embodiment, the inter-path correlations indicate dependencies between two or more paths that correspond to globally exposed assets. At block 416, based on the first data object and the second data object, at least the globally exposed asset in the plurality of assets in the content directory is asynchronously modified, for example, by transforming at least the globally exposed asset to add an import or an export.

In some embodiments, asynchronously modifying the at least one of the plurality of assets, such as the globally exposed asset, is based on the inter-path correlations identified in the second data object. Additionally or alternatively, asynchronously modifying the at least one of the plurality of assets, such as the globally exposed asset, is based on the plurality of identifiers that are aggregated in the first data object. In some embodiments, transforming the at least one asset of the plurality of assets, such as the globally exposed asset, comprises automatically changing source code in the content directory that corresponds to the asset(s) in order to indicate that said asset(s) is/are an export. In another embodiment, transforming the at least one asset of the plurality of assets, such as the globally exposed asset, comprises automatically changing source code in the content directory that corresponds to the asset(s) in order to add an import.

In various embodiments, a plurality of assets or artifacts in the code base are modified. A plurality of assets, and/or the identifier for the asset, that are globally exposed may be transformed, in some embodiments, by automatically changing source code in the content directory for the plurality of assets which are globally exposed in order to add an export or an import. In further embodiments, a third data object may be generated, wherein the third data object comprises the modified content directory having at least one asset that was modified or has been transformed to the import or the export using an automatic source code change. In one such embodiment, the updated content directory is written to storage in a database or a server.

Figure 5:
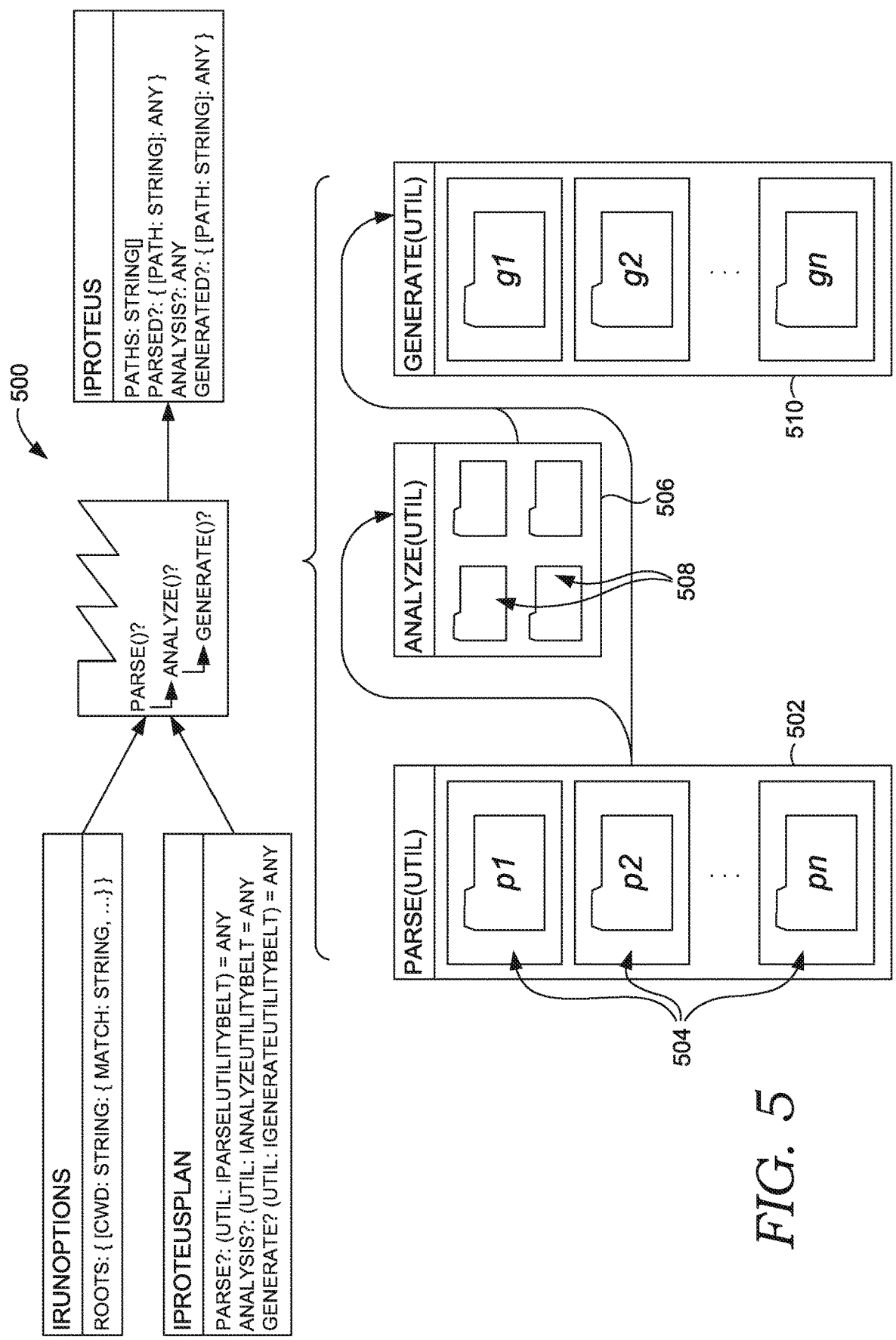
FIG. 5 is a diagram showing an example code base transformation environment suitable to implement embodiments of the present invention.
Figure 6:
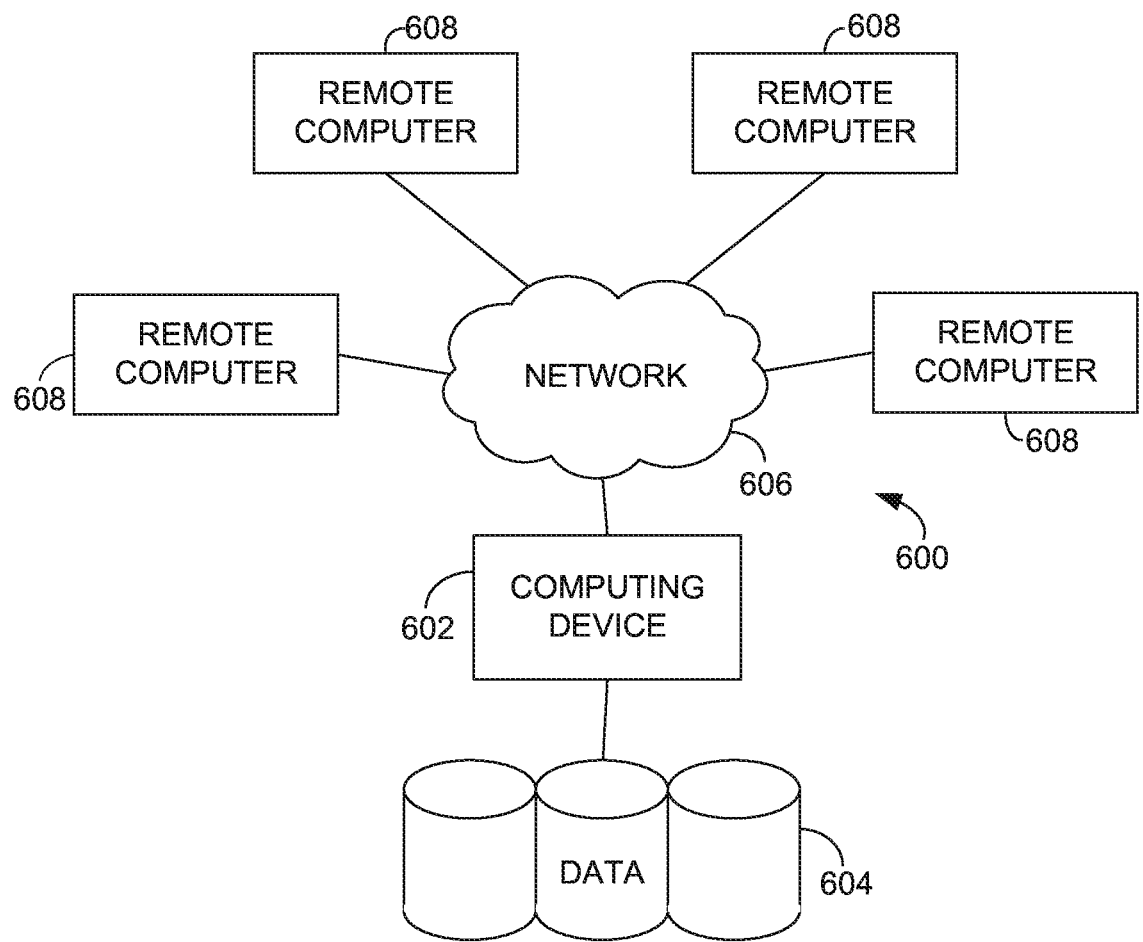
FIG. 6 is a diagram showing an example network environment suitable to implement embodiments of the present invention.

Turning to FIG. 5, a simplified diagram of a code base transformation environment 500 is illustrated, which is suitable for execution of the methods 200, 300, and 400, discussed herein with regards to FIGS. 2-4. The code base transformation environment 500 includes a representation of the parsing phase 502, into which a code base, shown as paths 504 (i.e., p1, p2 . . . p3) is input. The parsing phase 502 produces a first data object (i.e., a first utility object that acts as input to the analysis phase 506 (i.e., ANALYZE(UTIL)), in embodiments, once the parsing phase 502 has completed. The code base transformation environment 500 includes a representation of the analysis phase 506, which produces a second data object (i.e. a second utility object). The second data object comprises the inter-path correlations 508 identified. The second data object acts as input to the generation phase 510 (i.e., GENERATE(UTIL)), shown in the example of FIG. 5, when the analysis phase has completed. The generation phase 510 corresponds to the performance of the source code/code base transformation, which produces an updated code base that may be written to memory.

An example of computer functions for performance within the code base transformation environment 500 are shown below, wherein assets of "package.json" within "contentDirectory" are located through path parsing, analysis is used to determine which of those assets are "namespaced":

```
interface Proteus {
<P, A, G>(plan: IProteusPlan<P, A, G, true, true>): (
opts: IRunOptions)=
>Promise<IProteus<P, A, G>>;
}
//Example run to change non-scoped package names to scoped '@mpages/package'
name
proteus({
parse: ({path: contentDirectory})=>require(path.join(contentDirectory,
"package.json")),
analyze: MPageNamespaceAnalyzer,
generate: async ({parsed, analyzed, path: contentDirectory, useHash})=>{
const isContentEqual=await useHash({path: contentDirectory});
const packageJSON=parsed[contentDirectory];
//Perform transformation if package is not already namespaced
if (!analyzed.contains(contentDirectory)) {
await writeJSON(path.join(contentDirectory, "package.json"), {
. . . packageJSON,
name: '@mpages/SfpackageJSON.name}'
});
}
return !(await isContentEqual( ));
}
})({
roots: {
["C:/DirectoryToTransform"]: {match: "*", globOptions: {onlyDirectories:
true
}
})
```

It will be understood that the portions of source code discussed herein are merely examples and should not be construed as limiting because further embodiments are contemplated to be within the scope of this disclosure.

Regarding FIGS. 1 through 6, it will be understood by those of ordinary skill in the art that the environment(s), system(s), and/or methods(s) depicted are not intended to limit the scope of use or functionality of the present embodiments. Similarly, the environment(s), system(s), and/or methods(s) should not be interpreted as imputing any dependency and/or any requirements with regard to each component, each step, and combination(s) of components or step(s) illustrated therein. It will be appreciated by those having ordinary skill in the art that the connections illustrated the figures are contemplated to potentially include methods, hardware, software, and/or other devices for establishing a communications link between the components, devices, systems, and/or entities, as may be utilized in implementation of the present embodiments. As such, the absence of component(s) and/or steps(s) from the figures should be not be interpreted as limiting the present embodiments to exclude additional component(s) and/or combination(s) of components. Moreover, though devices and components in the figures may be represented as singular devices and/or components, it will be appreciated that some embodiments can include a plurality of devices and/or components such that the figures should not be considered as limiting the number of a devices and/or components.

It is noted that embodiments of the present invention described herein with reference to block diagrams and flowchart illustrations. However, it should be understood that each block of the block diagrams and/or flowchart illustrations can be implemented in the form of a computer program product, an entirely hardware embodiment, a combination of hardware and computer program products, and/or apparatus, systems, computing devices/entities, computing entities, and/or the like carrying out instructions, operations, steps, and similar words used interchangeably (e.g., the executable instructions, instructions for execution, program code, and/or the like) on a computer-readable storage medium for execution. For example, retrieval, loading, and execution of code can be performed sequentially such that one instruction is retrieved, loaded, and executed at a time. In some embodiments, retrieval, loading, and/or execution can be performed in parallel such that multiple instructions are retrieved, loaded, and/or executed together. Thus, such embodiments can produce specifically-configured machines performing the steps or operations specified in the block diagrams and flowchart illustrations. Accordingly, the block diagrams and flowchart illustrations support various combinations of embodiments for performing the specified instructions, operations, or steps.

Turning to FIG. 6, it depicts a block diagram of an example network environment suitable to implement embodiments of the present invention. The example network environment 600 is suitable to implement embodiments of the present invention. It will be understood by those of ordinary skill in the art that the example network environment 600 is just one example of a suitable computing environment and is not intended to limit the scope of use or functionality of the present invention. Similarly, the example network environment 600 should not be interpreted as imputing any dependency and/or any requirements with regard to each component and combination(s) of components illustrated in FIG. 6. It will be appreciated by those having ordinary skill in the art that the connections illustrated in FIG. 6 are also exemplary as other methods, hardware, software, and devices for establishing a communications link between the components, devices, systems, and entities, as shown in FIG. 6, may be utilized in implementation of the present invention. Although the connections are depicted using one or more solid lines, it will be understood by those having ordinary skill in the art that the exemplary connections of FIG. 6 may be hardwired or wireless, and may use intermediary components that have been omitted or not included in FIG. 6 for simplicity's sake. As such, the absence of components from FIG. 6 should be not be interpreted as limiting the present invention to exclude additional components and combination(s) of components. Moreover, though devices and components are represented in FIG. 6 as singular devices and components, it will be appreciated that some embodiments may include a plurality of the devices and components such that FIG. 6 should not be considered as limiting the number of a devices or components.

Continuing, the example network environment 600 of FIG. 6 is illustrated as being a distributed environment where components and devices may be remote from one another and may perform separate tasks. The components and devices may communicate with one another and may be linked to each other using a network 606. The network 606 may include wireless and/or physical (e.g., hardwired) connections. Exemplary networks include a telecommunications network of a service provider or carrier, Wide Area Network (WAN), a Local Area Network (LAN), a Wireless Local Area Network (WLAN), a cellular telecommunications network, a Wi-Fi network, a short range wireless network, a Wireless Metropolitan Area Network (WMAN), a Bluetooth® capable network, a fiber optic network, or a combination thereof. The network 606, generally, provides the components and devices access to the Internet and web-based applications.

The example network environment 600 comprises a computing device in the form of a server 602. In one embodiment, the computing device 602 is a server. Although illustrated as one component in FIG. 6, the present invention may utilize a plurality of local computing devices and/or remote computing devices in the example network environment 600. The computing device 602 may include components such as a processing unit, internal system memory, and a suitable system bus for coupling to various components, including a database or database cluster. The system bus may be any of several types of bus structures, including a memory bus or memory controller, a peripheral bus, and a local bus, using any of a variety of bus architectures. By way of example, and not limitation, such architectures include Industry Standard Architecture (ISA) bus, Micro Channel Architecture (MCA) bus, Enhanced ISA (EISA) bus, Video Electronic Standards Association (VESA) local bus, and Peripheral Component Interconnect (PCI) bus, also known as Mezzanine bus.

The computing device 602 may include or may have access to computer-readable media. Computer-readable media can be any available media that may be accessed by computing device 602, and includes volatile and nonvolatile media, as well as removable and non-removable media. By way of example, and not limitation, computer-readable media may include computer storage media and communication media. Computer storage media may include, without limitation, volatile and nonvolatile media, as well as removable and non-removable media, implemented in any method or technology for storage of information, such as computer-readable instructions, data structures, program modules, or other data. In this regard, computer storage media may include, but is not limited to, Random Access Memory (RAM), Read-Only Memory (ROM), Electrically Erasable Programmable Read-Only Memory (EEPROM), flash memory or other memory technology, CD-ROM, digital versatile disks (DVDs) or other optical disk storage, magnetic cassettes, magnetic tape, magnetic disk storage, or other magnetic storage device, or any other medium which can be used to store the desired information and which may be accessed by the computing device 602. Computer storage media does not comprise signals per se.

Communication media typically embodies computer-readable instructions, data structures, program modules, or other data in a modulated data signal, such as a carrier wave or other transport mechanism, and may include any information delivery media. As used herein, the term "modulated data signal" refers to a signal that has one or more of its attributes set or changed in such a manner as to encode information in the signal. By way of example, and not limitation, communication media includes wired media such as a wired network or direct-wired connection, and wireless media such as acoustic, radio frequency (RF), infrared, and other wireless media. Combinations of any of the above also may be included within the scope of computer-readable media.

In embodiments, the computing device 602 uses logical connections to communicate with one or more remote computing devices 608 within the example network environment 600. In one embodiment, the one or more remote computing devices 608 comprise external computer systems that leverage object-oriented programming. In embodiments where the network 606 includes a wireless network, the computing device 602 may employ a modem to establish communications with the Internet, the computing device 602 may connect to the Internet using Wi-Fi or wireless access points, or the computing device 602 may use a wireless network adapter to access the Internet. The computing device 602 engages in two-way communication with any or all of the components and devices illustrated in FIG. 6, using the network 606. Accordingly, the computing device 602 may send data to and receive data from the remote computing devices 608 over the network 606.

Although illustrated as a single device, the remote computers 608 may include multiple computing devices. In an embodiment having a distributed network, the remote computers 608 may be located at one or more different geographic locations. In an embodiment where the remote computers 608 are a plurality of computing devices, each of the plurality of computing devices may be located across various locations such as buildings in a campus, medical and research facilities at a medical complex, offices or "branches" of a banking/credit entity, or may be mobile devices that are wearable or carried by personnel, or attached to vehicles or trackable items in a warehouse, for example.

In some embodiments, the remote computing devices 608 are physically located in a setting such as, for example, a medical setting or a non-medical setting. An example of a medical setting is a laboratory, inpatient room, an outpatient room, a hospital, a medical vehicle, a veterinary environment, an ambulatory setting, a medical billing office, a financial or administrative office, hospital administration setting, an in-home medical care environment, and/or medical professionals' offices. An example of a non-medical setting, such as a packing and shipping facility or deployed within a fleet of delivery or courier vehicles.

Continuing, the example network environment 600 includes a database 604. In one embodiment, the database 604 comprises a SQL database. In some embodiments, the database 604 and at least the computing device 602, together, form an RDBMS. Although shown as a single component, the database 604 may be implemented using multiple data stores that are communicatively coupled to one another, independent of the geographic or physical location of a memory device. Exemplary data stores may also store data in the form of electronic records, for example, electronic medical records of patients, transaction records, billing records, task and workflow records, chronological event records, and the like.

Generally, the database 604 includes physical memory that is configured to store information encoded in data. For example, the database 604 may provide storage for computer-readable instructions, computer-executable instructions, data structures, data arrays, computer programs, applications, and other data that supports the functions and action to be undertaken using the example network environment 600 and components shown in exemplary FIG. 6.

In a computing environment having distributed components that are communicatively coupled via the network 606, program modules may be located in local and/or remote computer storage media including, for example only, memory storage devices. Embodiments of the present invention may be described in the context of computer-executable instructions, such as program modules, being executed by a computing device. Program modules may include, but are not limited to, routines, programs, objects, components, and data structures that perform particular tasks or implement particular data types. In embodiments, the computing device 602 may access, retrieve, communicate, receive, and update information stored in the database 604, including program modules. Accordingly, the computing device 602 may execute, using a processor, computer instructions stored in the database 604 in order to perform embodiments described herein.

Although internal components of the devices in FIG. 6, such as the computing device 602, are not illustrated, those of ordinary skill in the art will appreciate that internal components and their interconnection are present in the devices of FIG. 6. Accordingly, additional details concerning the internal construction of the device are not further disclosed herein.

The present invention has been described in relation to particular embodiments, which are intended in all respects to be illustrative rather than restrictive. Further, the present invention is not limited to these embodiments, but variations and modifications may be made without departing from the scope of the present invention.

What is claimed is:

1. One or more computer-readable storage media having computer-readable instructions embodied therein for execution by one or more processors, the computer-readable instructions comprising:

asynchronously parsing a code base to identify each of a plurality of paths in the code base that point to each of a plurality of assets, wherein the plurality of assets comprise a portion of globally-exposed assets and another portion of not globally-exposed assets, and wherein the code base was generated during a computer software build of an application;

identifying the portion of globally-exposed assets in the plurality of assets, the portion of globally-exposed assets being visible to a user of the application that corresponds to the code base;

extracting a plurality of identifiers that correspond to the portion of globally-exposed assets pointed to by the plurality of paths identified by parsing the code base;

generating a first data object of the plurality of identifiers that correspond to the portion of globally-exposed assets;

identifying inter-path correlations between the plurality of paths that correspond to the portion of globally-exposed assets;

generating a second data object of the inter-path correlations identified; and automatically modifying at least one of the globally-exposed assets in the code base based on the plurality of identifiers in the first data object and the inter-path correlations of the second data object, wherein the code base is transformed from a first framework to a second different framework based on modifying the at least one of the globally-exposed assets.

2. The media of claim 1, wherein an Abstract Syntax Tree (AST) parse function is used to parse each of the plurality of paths in the code base.

3. The media of claim 1, wherein the plurality of paths are directory paths.

4. The media of claim 1, wherein the computer-readable instructions further comprise identifying the plurality of the paths.

5. The media of claim 1, wherein the first data object further comprises information collected from the plurality of paths corresponding to the portion of globally-exposed assets.

6. The media of claim 1, wherein the computer-readable instructions further comprise:

automatically generating, without user input beyond an indication to begin a parsing phase comprising the parsing, an entire updated code base that comprises the at least one of the globally-exposed assets that was modified; and writing the updated code base to storage in a database or a server.

7. The media of claim 1, wherein the computer-readable instructions further comprise determining there is at least one dependency between two or more of the plurality of paths corresponding to the portion of globally-exposed assets.

8. One or more computer-readable storage media having computer-readable instructions embodied therein for execution by one or more processors, the computer-readable instructions comprising:

receiving a code base comprising a plurality of artifacts generated during a computer software build of an application and a plurality of paths corresponding to the plurality of artifacts to which the plurality of paths point, where the plurality of artifacts includes a portion of globally-exposed artifacts and another portion of not globally-exposed artifacts;

asynchronously parsing each of the plurality of paths, wherein asynchronously parsing includes caching data as it is parsed;

identifying the portion of globally-exposed artifacts in the plurality of artifacts, the portion of globally-exposed artifacts being visible to a user of the application that corresponds to the code base;

extracting a plurality of identifiers that correspond to the portion of globally-exposed artifacts that correspond to the plurality of paths asynchronously parsed;

aggregating the plurality of identifiers extracted;

generating a first data object of the plurality of identifiers aggregated;

identifying inter-path correlations between the plurality of paths that correspond to the portion of globally-exposed assets;

generating a second data object of the inter-path correlations; and asynchronously modifying the portion of globally-exposed artifacts in the code base using the plurality of identifiers in the first data object and the inter-path correlations of the second data object, wherein the code base is transformed from a first framework to a second different framework based on modifying the portion of globally-exposed artifacts.

9. The media of claim 8, further comprising:

determining that two or more of the plurality of artifacts interact; and based on determining that the two or more of the plurality of artifacts interact, determining there is a dependency between two or more of the plurality of paths that correspond to the two or more of the plurality of artifacts.

10. The media of claim 8, wherein the plurality of paths comprise content directories.

11. The media of claim 8, wherein the computer-readable instructions further comprise generating a dependency tree that represents each of the inter-path correlations identified.

12. The media of claim 11, wherein the second data object comprises the dependency tree.

13. One or more computer-readable storage media having computer-readable instructions embodied therein for execution by one or more processors, the computer-readable instructions comprising:

receiving a content directory comprising a plurality of assets and a plurality of paths corresponding to locations of the plurality of assets to which the plurality of paths point, wherein the plurality of assets comprise a portion of globally-exposed assets and another portion of not globally-exposed assets, and wherein the content directory is a representation of a code repository generated during a computer software build of an application;

asynchronously parsing each of the plurality of paths corresponding to the locations of the plurality of assets in the content directory;

identifying the portion of globally-exposed assets in the plurality of assets, the portion of globally-exposed assets being visible to a user of the application;

extracting a plurality of identifiers from the plurality of paths that correspond to the portion of globally-exposed assets;

aggregating the plurality of identifiers extracted;

generating a first data object of the aggregated plurality of identifiers;

analyzing the first data object by identifying inter-path correlations for the portion of globally-exposed assets;

generating a second data object of the inter-path correlations; and asynchronously modifying the portion of globally-exposed assets in the plurality of assets in the content directory using the aggregated plurality of identifiers in the first data object and the inter-path correlations of the second data object, wherein asynchronously modifying the portion of globally-exposed assets comprises transforming each globally-exposed asset in the portion of globally-exposed assets to add an import or to add an export to source code corresponding to the globally-exposed asset in the content directory.

14. The media of claim of 13, wherein asynchronously modifying the portion of globally-exposed assets comprises modifying identifiers that are specific to the portion of globally-exposed assets.

15. The media of claim 13, wherein asynchronously modifying the portion of globally-exposed assets comprises automatically changing source code in the content directory that corresponds to at least one of the globally-exposed assets to add the export at an end of the source code that corresponds to the at least one globally-exposed asset.

16. The media of claim 13, wherein asynchronously modifying the portion of globally-exposed assets comprises automatically changing source code in the content directory that corresponds to at least one of the globally-exposed assets to add the import at a beginning of the source code that corresponds to the at least one globally-exposed asset.

17. The media of claim 13, wherein the computer-readable instructions further comprise:

generating a third data object that comprises the modified content directory having the portion of globally-exposed assets and t another portion of not globally-exposed assets; and writing the modified content directory to storage in a database or a server.

* * * * *